April 27, 1954  E. T. JOHNSON  2,676,446
CROP HARVESTING AND WINDROWING MACHINE
Filed Jan. 29, 1951  3 Sheets-Sheet 2

INVENTOR.
E. T. Johnson
BY
Attorneys

April 27, 1954   E. T. JOHNSON   2,676,446
CROP HARVESTING AND WINDROWING MACHINE
Filed Jan. 29, 1951   3 Sheets-Sheet 3
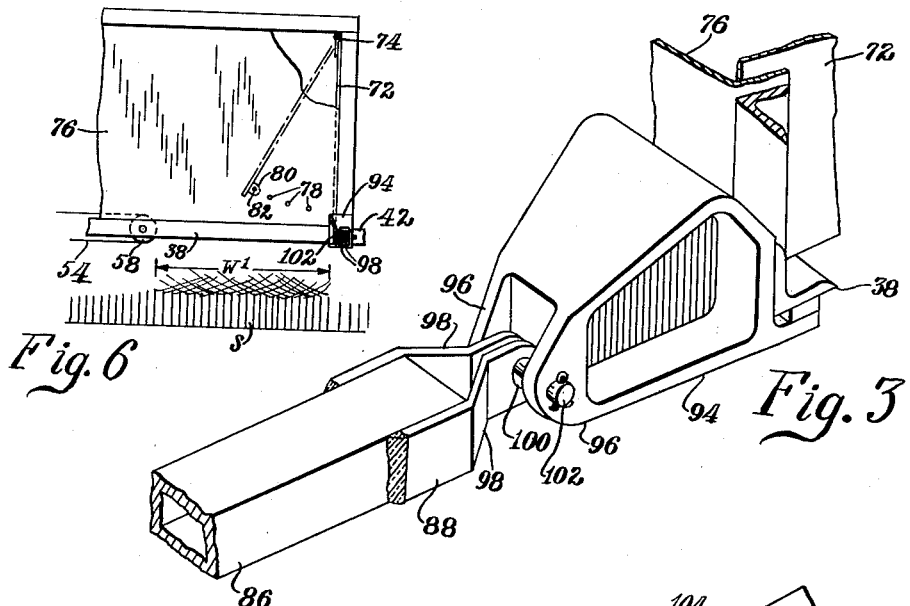
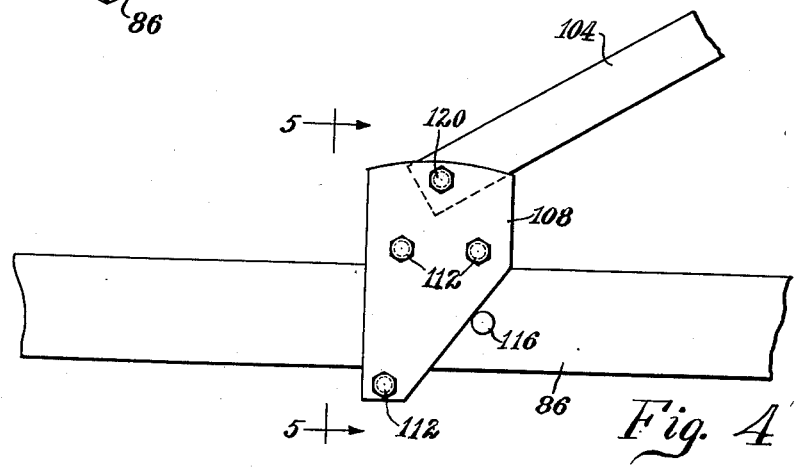
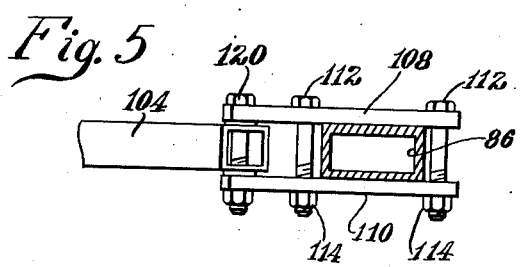
INVENTOR.
E. T. Johnson
BY
Attorneys Patented Apr. 27, 1954

2,676,446

UNITED STATES PATENT OFFICE 2,676,446

CROP HARVESTING AND WINDROWING MACHINE

Ellsworth T. Johnson, Moline, Ill., assignor to Deere & Company, Moline, Ill., a corporation of Illinois Application January 29, 1951, Serial No. 208,303

4 Claims. (Cl. 56—23)

This invention relates to an adjustable hitch for a crop harvesting and windrowing machine and more particularly to a hitch having adjustable positions for adapting the machine for use with a variety of tractors.

The conventional windrowing machine operates by advancing through a field of standing grain and has a cutter bar disposed transverse to the line of travel for cutting the grain and leaving standing stubble. The cut grain moves rearwardly to a platform or canvas that moves also transverse to the line of travel. This canvas operates to deliver the cut grain to one side of the machine, at which point it is discharged or deposited into the form of a relatively narrow windrow running parallel to the line of travel. The windrows thus formed are supported on the stubble and the grain is there allowed to remain for a curing period, after which it is picked up and further treated.

Windrowing machines of the character referred to are normally drawn by agricultural tractors. Such tractors may be of either two general types, one of which is the so-called tricycle or row-crop tractor and the other is the standard four-wheel or standard-tread tractor. The row-crop tractor has a pair of relatively widely spaced rear wheels, the tread of which is adjustable, and is supported at its front end by a single wheel or a pair of relatively closely spaced wheels. In the case of the standard-tread tractor, the rear wheels are not so widely spaced and in all cases the tread is not variable. Such tractor has a pair of relatively widely spaced front wheels, the tread of which is normally not variable. The windrowing machine is drawn by either of these tractors in a position in which the cutting mechanism of the machine is laterally offset to one side or the other of the longitudinal centerline of the tractor. Therefore, the discharge of cut grain to form a windrow will have a definite relationship to the tractor; although, it will be seen that this relationship will vary relative to the tractor wheels, depending upon which type tractor is used as the source of draft power.

In the conventional situation involving the drawing of agricultural implements or other trailing vehicles behind tractors, there is normally no problem involving the relationship between the tractor wheels and a function of the machine or vehicle being drawn. In the case of a windrower, however, it is important to discharge the cut grain into a windrow on top of stubble that has not been trampled or run down by the tractor wheels. If the windrower were to be utilized at all times with a certain type tractor, the hitching arrangement could be designed to accomplish the desired result. However, if a tractor with a different wheel tread were used, the relationship between the windrow and the tractor wheels would be different. The forming of a windrow on stubble that has been trampled or run down is not particularly desirable, since such windrow will not be properly supported to accommodate the circulation of air necessary to curing of the crop.

According to the present invention, the hitching arrangement for the windrowing machine is so designed as to be adjustable between two positions for accommodating the windrower to tractors of either of the types noted above. It is an object of the invention to design the hitch on the basis of the dimensional characteristics of tractors of these types so that regardless of which tractor is used, the windrow will be deposited upon stubble that has not been run down by the tractor wheels. It is a further object of the invention to provide a simple and economical windrower and hitch therefor that may be economically manufactured and sold and conveniently used.

The foregoing and other important objects and desirable features inherent in and encompassed by the invention will become apparent from the following disclosure of a preferred embodiment of the invention, having reference to the accompanying sheets of drawings in which Figure 1 is a top plan view, somewhat schematic, showing in full lines a windrowing machine drawn by a row-crop tractor, illustrating the relationship between the wheels of such tractor and a windrow formed by the windrowing machine; there is indicated in dotted lines in the view the position the tractor will occupy on the next round through the field; in dot-dash lines there are indicated the wheels of a standard-tread tractor, to illustrate the relationship between these wheels and the windrow;

Figure 3 is a fragmentary perspective view on a larger scale and showing the connection of the hitch or draft member to the windrower frame, as viewed in the direction of the arrow on the encircled numeral 3 in Figure 1;

Figure 4 is an enlarged top plan view of the connection between the hitch member and the brace for fixing the position of the hitch;

Figure 5 is a transverse sectional view taken on line 5—5 of Figure 4; and

Figure 6 is a fragmentary front elevational view, with parts omitted, and illustrating one form of adjustable means at the discharge end of the windrower for varying the width of the windrow.

Figure 1:
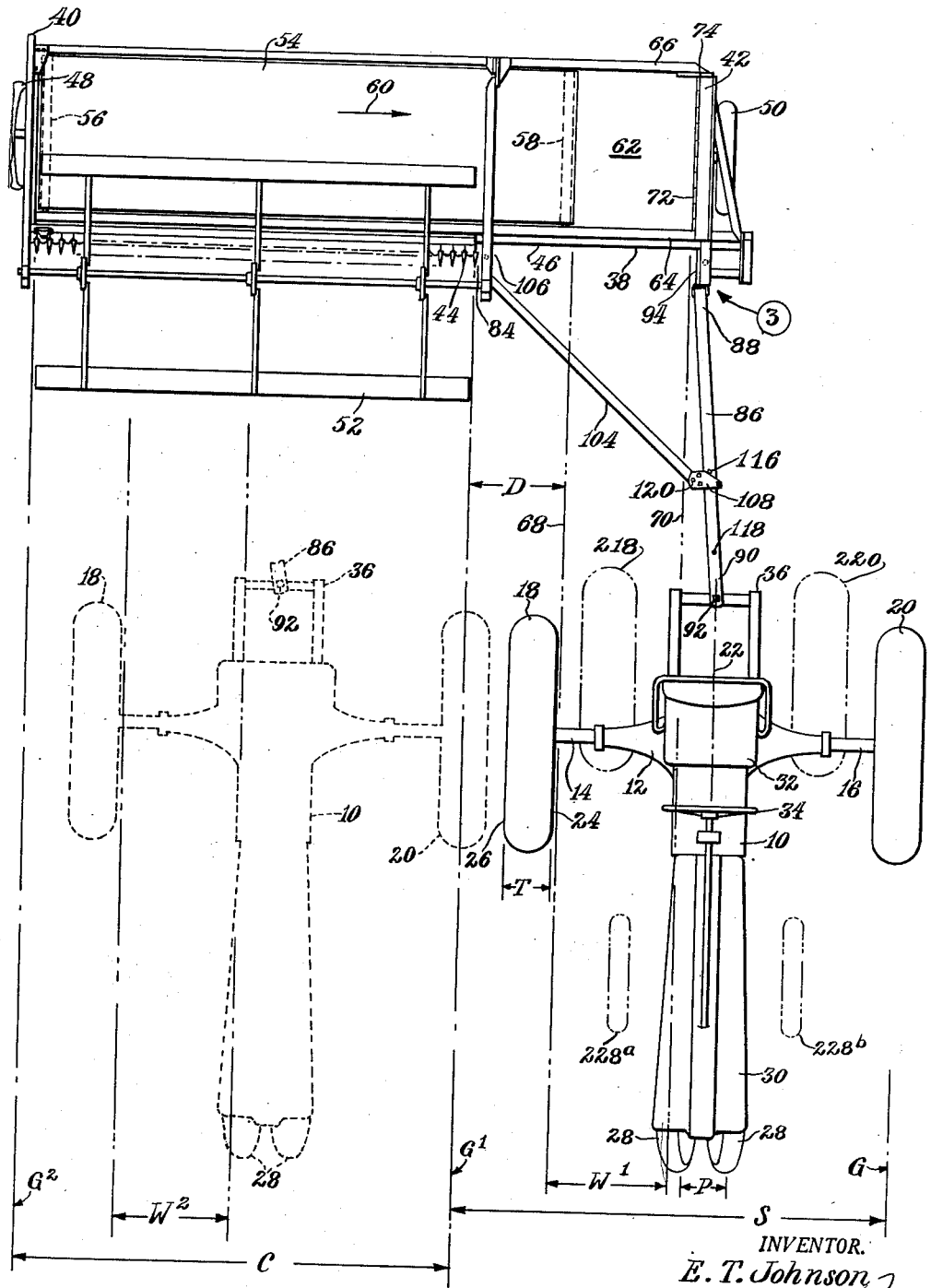

The crop harvesting and windrowing machine chosen for the purposes of illustration is adapted to be propelled forwardly over a field of standing crops selectively by either a row-crop tractor or a standard-tread tractor. A typical row-crop tractor is illustrated in full lines in Figure 1. This tractor comprises a longitudinal body 10 having a transverse rear axle structure 12 from which transverse, coaxial drive axles 14 and 16 project in opposite directions. These axles respectively have keyed thereto relatively large rear traction wheels 18 and 20. In a tractor of the type illustrated, tread or transverse spacing between the wheels 18 and 20 is variable or adjustable by moving the wheels axially on their axles. In Figure 1, the wheels 18 and 20 are shown as being substantially in their most widely spaced positions, the tread or transverse spacing between these wheels being on the order of approximately 88 inches and the wheels being equidistant from the longitudinal centerline of the tractor, which centerline is indicated by the numeral 22.

Each of the wheels 18 and 20 is conventionally pneumatically tired and there is accordingly a substantial transverse dimension T between the inner and outer faces of the wheels. As to the right-hand wheel 18, the inner and outer faces are designated respectively by the numerals 24 and 26. Here, as elsewhere in this description, the use of the expressions "right-hand" and "left-hand" is made with reference to the position of an observer standing behind the machine and looking forwardly.

The tractor body 10 is carried at its front end on a steerable truck, here shown as comprising a pair of relatively closely spaced front wheels 28. These wheels are conventionally quite a bit smaller than the rear wheels 18 and 20 and are conventionally pneumatically tired. These wheels roll along what may be considered for all practical purposes as a single track or path that is relatively narrow as indicated by the dimension P.

The forward portion of the tractor body 10 includes a conventional engine hood 30, behind which is an operator's seat 32. A steering wheel 34 conventionally controls the steering of the front wheels 28. The tractor has at its rear end a centrally located drawbar 36.

The crop harvesting and windrowing machine comprises a mobile frame 38 of elongated construction having its length transverse to the line of travel and including a grainward end 40, a stubbleward end 42, and cutting mechanism 44 along a portion of its front edge 46. In the present illustration, the grainward end 40 of the frame 38 is at the right and the stubbleward end 42 is at the left. The machine is therefore of the type known as a right-hand cut. In the case of a machine that cuts at the left, the various relationships referred to and to be amplified below will be reversed.

The frame 38 is rendered mobile by a grainward wheel 48 and a stubbleward wheel 50.

A rotatable reel 52, which may be of conventional construction, cooperates with the cutting mechanism 44 to cut a swath of grain across a width designated by the dimension C. The grain thus cut is delivered rearwardly to conveying means, here shown as a conventional canvas conveyor 54. This conveyor is carried at its grainward end on a roller 56 and at its stubbleward end on a similar roller 58. The conveyor moves in the direction of the arrow 60 (stubblewardly) to carry the cut grain to a zone of discharge, in which zone it will be compelled by discharge means to form a windrow along a path parallel to the line of travel and here shown as having the transverse dimension $W^1$.

The discharge means in the present case takes the form of an opening 62 of rectangular shape defined by the stubbleward end of the conveyor 54, the stubbleward end 42 of the frame 38 and front and rear frame members 64 and 66. In a previous round over the field, the windrower will have cut grain so as to leave a width of stubble at S. It will be noted, of course, that the dimensions C and S are equal. The letter G designates the line of standing grain at the left in the previous cut of the machine, and the letter $G^1$ indicates the left-hand line of standing grain in the cut being made at C. The letter $G^2$ represents the left-hand standing grain line for the next cut, or the right-hand standing grain line for the cut being made.

It will be noted that the windrow $W^1$ is laid on top of the stubble within the dimension S and that the dimension $W^1$ is considerably less than the dimension S. The right-hand or grainward side 68 of the windrow $W^1$ coincides generally with the junction of the stubbleward or discharge end of the conveyor 54 with the discharge means or opening 62. As will be brought out more clearly below, the disposition of the windrow with its grainward side along the line 68 is important. The maximum width of the windrow $W^1$, as measured between the grainward line 68 and its stubbleward side or line 70 is also important. However, the width of the windrow may be varied within the transverse dimension between 68 and 70. For this purpose, there is provided at the stubbleward end of the frame 38 an upright shield or deflector 72 which provides means for effecting the variation in width of the windrow $W^1$ between the dimensions noted. This shield is hinged at its upper end on a longitudinal horizontal pivot 74 for selective adjustment between the positions illustrated in Figure 6. The front portion of the windrower, between the stubbleward end of the cutting mechanism 44 and the stubbleward end 42 of the frame 38 includes a front sheet 76 which has a plurality of openings 78 therein. These openings are preferably arranged on an arc having the hinge 74 as its center. The lower portion of the shield 72 is provided with an apertured ear 80 and a removable pin 82 may be utilized for cooperation between the ear 80 and any selected one of the openings 78 for positioning the lower end of the shield 72 relative to the stubbleward or discharge end of the conveyor 58. The adjustment in effect provides for varying the transverse width of the opening 62. Other forms of adjustment could be utilized in the combinations herein presented.

The width C (and likewise the width of stubble S) is determined, of course, by the width of the cutting mechanism 44. In the present case, the stubbleward end of the cutting mechanism 44, which end is designated by the numeral 84, terminates short of the stubbleward end of the conveyor 54 by a dimension D which is greater than, or is at least no less than, the dimension T representing the width of the tire on the traction wheel 18. It will be observed that the dimension D is between the standing grain line G¹ and the grainward side 68 of the windrow W¹. As stated above, the line 68 represents substantially the junction between the conveyor 54 and the discharge means or opening 62. The purpose of the provision of the short transverse distance D is to allow a path along which the right-hand or grainward traction wheel 18 can run, leaving a substantial distance or clearance between the outer face 26 of the wheel 18 and the standing grain line G¹. As shown in dotted lines in Figure 1, the same short distance or clearance is available between the traction wheel 18 and the standing grain line G² on the next cut. Although it appears from the dotted position of the tractor in Figure 1 that the left-hand traction wheel 20 runs along the line G¹, this is immaterial, for the new windrow formed at W², like the old windrow at W¹, is formed with reference to the right-hand traction wheel 18 and the front wheels 28. Therefore, in the case of a right-hand-cut machine, the position of the left-hand traction wheel of the tractor becomes relatively unimportant.

The relationship between the windrowing machine and the row-crop tractor is obtained by an adjustable hitch member 86 having a frame-proximate end 88 and a tractor-proximate end 90. The hitch member is disposed generally along the line of travel and may be connected at its front or tractor-proximate end to the tractor drawbar by such conventional means as a hitch pin 92. The connection of the rear or frame-proximate end 88 of the hitch member 86 is preferably accomplished by structure such as that shown in Figure 3. In that figure, it is shown that the stubbleward and forward portion of the windrower frame 38 has rigidly mounted thereon a bracket 94 which includes a pair of transversely alined apertured ears 96. The rear end of the hitch member 86 is provided with a pair of straps 98, each of which has an opening or aperture 100 (only one of which appears in the drawings). A transverse connecting pin 102 is passed through the thus alined apertures to effect a connection between the hitch member 86 and the windrower frame 38. It will be noted that the aperture 100 is somewhat larger than the outside diameter of the connecting pin 102, thus allowing sufficient play or lost-motion in the connection to provide for lateral swinging of the hitch member 86 through a limited range sufficient for the present purposes. This limited range of lateral swinging of the front end 90 of the hitch member 86 includes a first position as shown in Figure 1 and a second position as shown in Figure 2.

Either of the positions of the hitch member 86 is maintained by means comprising a diagonal brace 104 which may be connected at its rear end to the windrower frame at the point 106 by means such as that illustrated in Figure 3. The front end of the brace 104 is adjustably connected to an intermediate portion of the hitch member 86 by clamping or locating means comprising upper and lower plates 108 and 110 respectively above and below the hitch member 86 (Figures 4 and 5). The plates 108 and 110 are releasably clamped in position on the hitch member 86 by a plurality of releasable means such as bolts 112 and nuts 114. The plates may thus be shifted lengthwise of the hitch member 86, as between a pair of stops shown representatively at 116 and 118; although, equivalent means could obviously be used. The stop 116 determines the first position of the hitch member (Figure 1) and the stop 118 determined the second position (Figure 2). The front end of the brace 104 is connected by a pin or bolt 120 to the plates 108 and 110.

Figure 2:
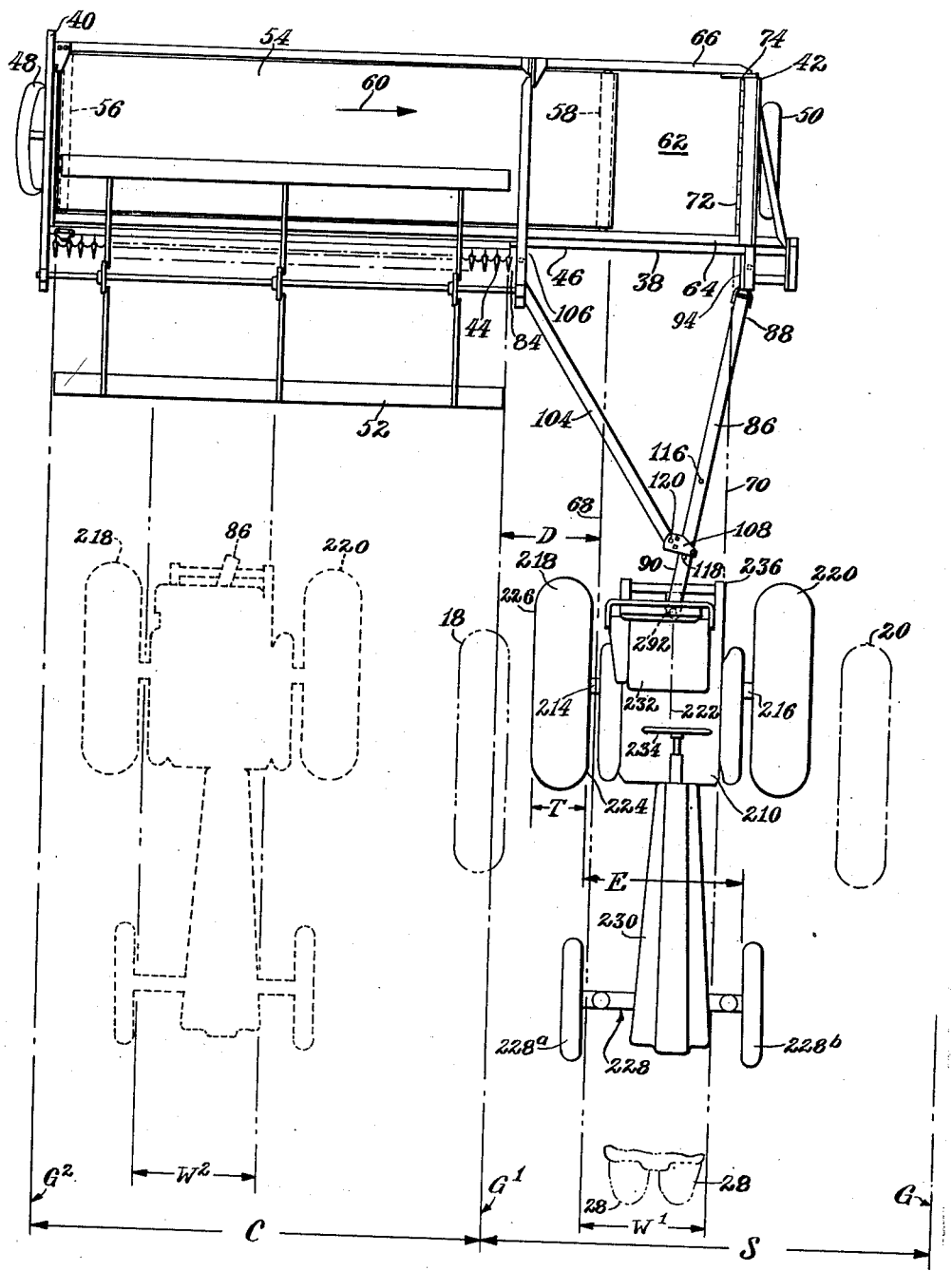
Figure 2 is a view similar to Figure 1 but showing in full lines the relationship between the windrower and a standard-tread tractor, dotted lines being utilized to show the position of the tractor on the next round and dot-dash lines being used to show the relative position of a row-crop tractor.

Figure 2 illustrates the use of the windrowing machine with a standard-tread or four-wheel tractor. This tractor comprises a longitudinal body comprising, in general, the same components as the tractor illustrated in Figure 1. Therefore, for the purposes of convenience, the same reference characters will be utilized on the tractor in Figure 2, but the numerals will be prefixed by the numeral 2. For example, the tractor in Figure 2 has a body 210 carried on rear traction wheels 218 and 220 and having a rear drawbar 236. The longitudinal centerline of this tractor is designated by a line identified by the numeral 222. The hitch member 86 is in its second position and connection thereof to the drawbar 236 is effected by a connecting or hitch pin 292. The transverse width of the right-hand traction wheel 218 is again designated by the letter T.

An exception to the general plan of numbering the tractor will be made with respect to the front end of the standard-tread tractor, because of the relationship of the front wheels to the windrows and the windrowing machine. The front axle structure will be designated generally by the numeral 228. This axle structure includes a right-hand wheel 228a and a left-hand wheel 228b.

When the hitch member 86 is in its second position, as shown in Figure 2, the windrow W¹ is laid between the wheel tracks. The front wheels 228a and 228b are respectively in substantial longitudinal alinement with the rear wheels 218 and 220. The transverse distance between the inside face 224 of the right-hand rear wheel 218 and the inside face of the opposite or stubbleward front wheel 228b is shown at E. It will be seen that this distance is greater than the width of the windrow W¹. It will also be observed that the distance D is again useful in providing clearance between the right-hand rear wheel 218 and the standing grain line G¹, just as in the case of Figure 1.

The positionability of the hitch member 86 produces the results that may be observed in general as follows: In the case of the use of the windrowing machine with the row-crop tractor (Figure 1), the windrow W¹ is laid between the inside of the right-hand traction wheel 18 and the path P traveled by the closely spaced front wheels 28. The observation to be made here is not that the windrow is placed in such position that it will not be run over by the wheels 18 or 28—since the windrow is formed behind the tractor—but that the windrow is laid on stubble that is not trampled by either the front or rear wheels. At the same time, the spacing at D is sufficient to provide clearance between the outside 26 of the wheel 18 and the standing grain line G¹. Thus, the wheel 18 does not trample any of the standing grain. On the next round over the field, the tractor occupies the position shown in dotted lines and the next windrow W² will be laid as shown and again there is clearance between the outside of the wheel 18 and the standing grain line G². On every round of the field, the relationship between the windrow and the tractor wheels will be the same.

In the case of Figure 2, the hitch member 86 is set in its inward position and the windrow W¹ is laid between the wheel tracks. The same conditions of clearance relative to the standing grain lines $G^1$ and $G^2$, and subsequent standing grain lines, obtain on successive rounds of the field. It will also be observed that narrowing of the windrow $W^1$ between the lines 68 and 70 will not affect the relationship between the windrow and either of the tractors.

The critical relationship between the tractors and the hitch position may be observed in another manner: In Figure 1 there are shown in dot-dash lines the wheels 218, 220, 228a and 228b of the standard-tread tractor in a hypothetical situation in which the hitch member 86 would be utilized in its first position for connection to the standard-tread tractor. It will be seen that the results are directly contrary to what is desired. The wheels 218 and 228a run precisly along a path centrally of the windrow to be formed. Thus, these wheels would trample the stubble. Therefore, the hitch should not be used in its first position with the standard-tread tractor.

As shown in dot-dash lines in Figure 2, undesirable results would be obtained by hitching a row-crop tractor to the windrower with the hitch member 86 in its second position. Although the wheels 18 and 20 would clear the windrow $W^1$, the front wheels 28 would run along and trample the stubble in a path on which the windrow would be laid. Also, the right-hand traction wheel 18 would trample the standing grain inside the line $G^1$. These undesirable results are, of course, avoided by utilizing the different positions of the hitch member 86 according to the types of tractors being untilized.

The hitching arrangement illustrated, with respect to the relationship of the discharge and laying of the windrow by the means 62, is based upon tractor dimensions that are relatively standard among the agricultural tractor manufacturers. As stated above, the illustrated tread or transverse distance between the wheels 18 and 20 of the row-crop tractor is on the order of 88 inches. This is the normally used widest spacing available in this type of tractor and in the use of the tractor with the windrowing machine shown, the wheels should be set at this spacing for best results. The pneumatic tire conventionally used on the rear wheels of a tractor of this type is 11 x 38. The conventional tires on the front wheels are 5.50 x 16.

In Figure 2, the tread or transverse spacing between the wheels 218 and 220 is 52 inches. In the cases of the larger size standard-tread tractors, the wheel tread at the rear wheels may be as wide as 60 to 62 inches. However, because of the distance D, wider spacing of the wheels than shown in Figure 2 will be accommodated. The tires on the rear wheels of the tractor in Figure 2 are 10 x 24 and the tires on the front wheels may be 5 x 15.

The design of the arrangement shown will therefore easily and readily accommodate different makes of tractors in either of the two types referred to and in any case the windrow will be laid in the manner herein outlined.

It is not desired that this invention be limited to the exact details of construction shown and described, for obvious modifications will occur to those skilled in the art.

What is claimed is:

1. A crop harvesting and windrowing machine adapted to be propelled forwardly over a field of standing crops selectively by either a row-crop tractor having laterally adjustable, widely spaced rear wheels and a steerable front truck or a standard-tread tractor having widely spaced rear wheels and widely spaced front wheels, comprising: a mobile frame of elongated construction transverse to the line of travel and having a grainward end and a stubbleward end and further including a leading front edge transverse to the line of travel and having cutting mechanism along a portion thereof; crop-conveying means carried by the frame behind the cutting mechanism to receive harvested crops from said cutting mechanism and arranged to move such crops transversely toward the stubbleward end of the frame; crop-discharge means adjoining the stubbleward end of the conveying means for receiving crops from said conveying means for effecting delivery of such crops on top of stubble in a windrow parallel to the line of travel so that the grainward side of the windrow coincides generally with the stubbleward end of the conveying means and the crop-discharge means; said cutting mechanism at its stubbleward end terminating short of said stubbleward end of the conveying means by a distance no less than the width of a conventional pneumatic tire for the rear wheel of the larger of the aforementioned tractors; a hitch member disposed generally fore and aft at the stubbleward end of the frame and having a frame-proximate end and an opposite, tractor-proximate end; means connecting the frame-proximate end of the hitch member to the frame for selective lateral positioning of the tractor-proximate end between either first or second hitch positions for connection selectively to a row-crop tractor or a standard-tread tractor on the approximate centerline of the selected tractor; said first hitch position being spaced stubblewardly from the aforesaid stubbleward end of the conveying means a distance approximately equal to the distance between the centerline of such row-crop tractor and the inside face of its grainward rear wheel when such wheel is in its most widely spaced tread position; said second hitch position being spaced stubblewardly from the aforesaid stubbleward end of the conveying means a distance approximately equal to the distance between the centerline of such standard-tread tractor and the inside face of its grainward rear wheel; means connected to the frame and to the hitch member for selectively fixing the tractor-proximate end of the hitch member in either of said hitch positions; and means at the stubbleward end of the frame and cooperative with the crop-discharge means in the laying of a windrow as aforesaid for spacing the stubbleward edge of such windrow transversely from said grainward edge of the windrow a distance no greater than the transverse distance between the inside face of the rear wheel on the grainward side of such standard-tread tractor and the inside face of the front wheel on the stubbleward side of such tractor.

2. The invention defined in claim 1, further characterized in that: said last named means is selectively adjustable laterally relative to said junction to narrow the width of the windrow; and means is cooperative with said adjustable means for selectively fixing the adjustment thereof.

3. A crop harvesting and windrowing machine adapted to be propelled forwardly over a field of standing crops selectively by either a row-crop tractor having laterally adjustable, widely spaced rear wheels and a steerable front truck or a standard-tread tractor having widely spaced rear wheels and widely spaced front wheels, comprising: a mobile frame of elongated construction transverse to the line of travel and having a grainward end and a stubbleward end and further including a leading front edge transverse to the line of travel and having cutting mechanism along a portion thereof; crop-conveying means carried by the frame behind the cutting mechanism to receive harvested crops from said cutting mechanism and arranged to move such crops transversely toward the stubbleward end of the frame; crop-discharge means adjoining the stubbleward end of the conveying means for receiving crops from said conveying means for effecting delivery of such crops on top of stubble in a windrow parallel to the line of travel so that the grainward side of the windrow coincides generally with the stubbleward end of the conveying means and the crop-discharge means; a hitch member disposed generally fore and aft at the stubbleward end of the frame and having a frame-proximate end and an opposite, tractor-proximate end; means connecting the frame-proximate end of the hitch member to the frame for selective lateral positioning of the tractor-proximate end between either first or second hitch positions for connection selectively to a row-crop tractor or a standard-tread tractor on the approximate centerline of the selected tractor; said first hitch position being spaced stubblewardly from the aforesaid stubbleward end of the conveying means a distance approximately equal to the distance between the centerline of such row-crop tractor and the inside face of its grainward rear wheel when such wheel is in its most widely spaced tread position; said second hitch position being spaced stubblewardly from the aforesaid stubbleward end of the conveying means a distance approximately equal to the distance between the centerline of such standard-tread tractor and the inside face of its grainward rear wheel; means connected to the frame and to the hitch member for selectively fixing the tractor-proximate end of the hitch member in either of said positions; and means at the stubbleward end of the frame and cooperative with the crop-discharge means in the laying of a windrow as aforesaid for spacing the stubbleward edge of such windrow transversely from said grainward edge of the windrow a distance no greater than the transverse distance between the inside face of the rear wheel on the grainward side of such standard-tread tractor and the inside face of the front wheel on the stubbleward side of such tractor.

4. A crop harvesting and windrowing machine adapted to be propelled forwardly over a field of standing crops selectively by either a row-crop tractor having laterally adjustable, widely spaced rear wheels and a steerable front truck or a standard-tread tractor having widely spaced rear wheels and widely spaced front wheels, comprising: a mobile frame of elongated construction transverse to the line of travel and having a grainward end and a stubbleward end and further including a leading front edge transverse to the line of travel and having cutting mechanism along a portion thereof; crop-conveying means carried by the frame behind the cutting mechanism to receive harvested crops from said cutting mechanism and arranged to move such crops transversely toward the stubbleward end of the frame; crop-discharge means adjoining the stubbleward end of the conveying means for receiving crops from said conveying means for effecting delivery of such crops on top of stubble in a windrow parallel to the line of travel so that the grainward side of the windrow coincides generally with the stubbleward end of the conveying means and the crop-discharge means; a hitch member disposed generally fore and aft at the stubbleward end of the frame and having a frame-proximate end and an opposite, tractor-proximate end; means connecting the frame-proximate end of the hitch member to the frame for selective lateral positioning of the tractor-proximate end between either first or second hitch positions for connection selectively to a row-crop tractor or a standard-tread tractor on the approximate centerline of the selected tractor; said first hitch position being spaced stubblewardly from the aforesaid stubbleward end of the conveying means a distance approximately equal to the distance between the centerline of such row-crop tractor and the inside face of its grainward rear wheel when such wheel is in its most widely spaced tread position; said second hitch position being spaced stubblewardly from the aforesaid stubbleward end of the conveying means a distance approximately equal to the distance between the centerline of such standard-tread tractor and the inside face of its grainward rear wheel; and means connected to the frame and to the hitch member for selectively fixing the tractor-proximate end of the hitch member selectively in either of said positions.

References Cited in the file of this patent

UNITED STATES PATENTS

| Number | Name | Date |
| --- | --- | --- |
| 793,787 | Heser | July 4, 1905 |
| 1,818,256 | Hoesing | Aug. 11, 1931 |
| 1,849,306 | MacGregor | Mar. 15, 1932 |
| 1,905,409 | Innes | Apr. 25, 1933 |
| 1,960,596 | Rimple | May 29, 1934 |
| 2,071,844 | Korsmo et al. | Feb. 23, 1937 |
| 2,530,668 | Tallman | Nov. 21, 1950 |
| 2,593,617 | Schroeppel | Apr. 22, 1952 |

FOREIGN PATENTS

| Number | Country | Date |
| --- | --- | --- |
| 511,546 | France | Sept. 25, 1920 |